US012172837B2

United States Patent
O'Brien et al.

(10) Patent No.: US 12,172,837 B2
(45) Date of Patent: Dec. 24, 2024

(54) ROBOTIC AUTOMATED STORAGE AND RETRIEVAL SYSTEM AND METHOD OF STORING ARTICLES

(71) Applicant: Dematic Corp., Grand Rapids, MI (US)

(72) Inventors: Mark D. O'Brien, Kentwood, MI (US); Kevin M. Heath, Clarksville, MI (US)

(73) Assignee: Dematic Corp., Grand Rapids, MI (US)

( * ) Notice: Subject to any disclaimer, the term of this patent is extended or adjusted under 35 U.S.C. 154(b) by 789 days.

(21) Appl. No.: 17/323,471

(22) Filed: May 18, 2021

(65) Prior Publication Data

US 2021/0371203 A1 Dec. 2, 2021

Related U.S. Application Data

(60) Provisional application No. 63/030,429, filed on May 27, 2020.

(51) Int. Cl.
*B65G 1/137* (2006.01)
*B65G 1/04* (2006.01)

(52) U.S. Cl.
CPC ......... *B65G 1/1373* (2013.01); *B65G 1/0435* (2013.01)

(58) Field of Classification Search
CPC .. B65G 1/0435; B65G 47/902; B65G 47/907; B25J 15/0052; B25J 15/0057; B25J 18/007; B25J 15/0253
(Continued)

(56) References Cited

U.S. PATENT DOCUMENTS 6,039,375 A * 3/2000 Bauman ............... B25J 15/0253
901/31
6,227,793 B1 * 5/2001 Knighten ............. B25J 15/0253
414/744.5
(Continued)

FOREIGN PATENT DOCUMENTS

| CN | 106743019 A | 5/2017 |
| CN | 108016800 A | 5/2018 |

(Continued)

OTHER PUBLICATIONS

International Search Report and Written Opinion of the International Searching Authority from corresponding Patent Cooperation Treaty (PCT) Application No. PCT/IB2021/054333, indicated completed on Jul. 6, 2021.
(Continued)

*Primary Examiner* — Timothy R Waggoner
(74) *Attorney, Agent, or Firm* — Gardner, Linn, Burkhart & Ondersma LLP

(57) ABSTRACT

An automated storage and retrieval system and method of storing articles to and retrieving articles from at least one stacked storage rack that is configured to store articles double deep in each storage location with one article at a front position and another article at a back position behind the one article includes a robot having an end of arm tool (EOAT). The EOAT has a platform and an extendable article manipulator. The platform is sized to support at least two articles. The robotic arm selectively positions the end of arm tool to retrieve articles from front and back storage positions of said at least one stacked storage rack and storing at least one of the articles from the platform to a front or back storage position after the robot rotates the EOAT about a generally vertical axis.

25 Claims, 7 Drawing Sheets

(58) Field of Classification Search
USPC .......................................................... 414/280
See application file for complete search history.

(56) References Cited

U.S. PATENT DOCUMENTS

| | | | |
|---|---|---|---|
| 10,065,798 B2 | 9/2018 | Borders et al. | |
| 10,322,876 B2 * | 6/2019 | Preidt | B65G 1/1371 |
| 11,661,274 B1 * | 5/2023 | Patel | B25J 9/0096 |
| | | | 414/278 |
| 2010/0290874 A1 | 11/2010 | Wolkerstorfer | |
| 2012/0039699 A1 * | 2/2012 | Ward | B65G 57/26 |
| | | | 414/590 |
| 2018/0082757 A1 * | 3/2018 | Chambers | G16H 40/67 |
| 2020/0016770 A1 * | 1/2020 | Kamranzadeh | B25J 9/06 |

FOREIGN PATENT DOCUMENTS

| | | |
|---|---|---|
| CN | 110921170 A | 3/2020 |
| EP | 2354045 A1 | 8/2011 |
| ES | 1156408 U | 5/2016 |
| JP | S6061209 U | 4/1985 |
| JP | H0764435 B2 | 7/1995 |
| WO | 2013004695 A1 | 1/2013 |

OTHER PUBLICATIONS

Search Report from corresponding European Patent Application No. 21814503.5 dated May 28, 2024.

* cited by examiner

ROBOTIC AUTOMATED STORAGE AND RETRIEVAL SYSTEM AND METHOD OF STORING ARTICLES

CROSS REFERENCE TO RELATED APPLICATIONS

The present application claims priority of U.S. provisional application Ser. No. 63/030,429, filed May 27, 2020, which is hereby incorporated herein by reference in its entirety.

BACKGROUND OF THE INVENTION

The present invention is directed to robotic automated storage and retrieval systems (ASRS) that store articles in a shelving system, or stacked rack, which may be provided in pairs around a stationary robot and method of storing articles. The term "robot" is intended to be broadly defined to include arm type robots, gantry type robots and the like. When the articles are stored in double rows of articles, one behind the other, known as double deep storage, the robotic may have an end-of-arm tool (EOAT), such as with long fixed fork extensions mounted to the end of the robot arm. When a desired article is stored in the back row farthest from the robotic arm EOAT, both articles are removed to a stationary location, the remaining load is repositioned onto the EOAT and the article from the front row replaced to the rack typically to the back row. This removal process is slow and cumbersome. The rack(s) may be made in circular shapes arranged in a circumference with the robot in the center of the circumference.

SUMMARY OF THE INVENTION

The present invention provides a robotic automated storage and retrieval system and method of storing and retrieving articles that is significantly faster and more stream-lined than known systems. An automated storage and retrieval system and method of storing articles to and retrieving articles from at least one stacked storage rack that is configured to store articles double deep in each storage location with one article at a front position and another article at a back position behind the one article; according to an aspect of the invention, includes a robot having an end of arm tool (EOAT). The EOAT has a platform and extendable article manipulator. The platform is sized to support at least two articles. The article manipulator is adapted to extend and retract double deep in opposite directions from opposite ends of the platform in order to retrieve at least one article to the platform at a storage location of the at least one stacked storage rack with the article manipulator extending in one of the directions. The robot is adapted to rotate the end of arm tool about a generally vertical axis with the at least one articles on the platform to store at least one article from said platform to the storage location of the at least one of said stacked storage rack with the article manipulator extending in the opposite of the directions.

The extendable article manipulator may concurrently position at least one article to the platform or remove at least one article from the platform. The extendable article manipulator may concurrently remove at least one article from front and back positions of the rack and position the articles to the platform or remove at least one article from the platform and store the article to front or back position of the rack.

The extendable article manipulator may be a platen that is adapted to support at least one article from below or a pair of arms adapted to support at least one article from its sides. The extendable article manipulator may be adapted to support variable width articles. The platform may be a conveying surface. The at least one stacked storage rack may have an arcuate front and may be a pair of stacked storage racks that are facing each other on opposite sides of the robotic positioning device.

An automated storage and retrieval system and method of storing articles to and retrieving articles from at least one stacked storage rack that is configured to store articles double deep in each storage location with one article at a front location and another article at a back location behind the one article, according to an aspect of the invention, includes a robot having an end of arm tool (EOAT). The EOAT has a platform and extendable article manipulator. The platform is sized to support at least two articles. The article manipulator is adapted to extend and retract double deep in opposite directions from opposite ends of the platform in order to retrieve at least two articles to the platform at a storage location of the at least one stacked storage rack with the article manipulator extending in one of the directions. The robotic arm is adapted to rotate the end of arm tool about a generally vertical axis with the at least two articles on the platform to store at least one article from said platform to the storage location of the at least one of the stacked storage rack with the article manipulator extending in the opposite of the directions.

The EOAT may selectively store one of the articles to a front or back storage position after the robotic arm rotates the EOAT and discharges the other of the articles to a discharge conveyor after storing the one of the articles. The extendable article manipulator may be a platen adapted to support at least two articles from below or a pair or arms adapted to support at least two article from its sides. The extendable article manipulator may be adapted to support variable width articles. The platform may have a conveying surface. The at least one stacked storage rack may have an arcuate front and may be a pair of stacked storage racks that are facing each other on opposite sides of the robotic positioning device. The robot may selectively position the end of arm tool to store at least one of the articles from the platform to a front or back storage location after the robot rotates the EOAT 180 degrees about the generally vertical axis.

Other objects, features and advantages will be apparent upon review of the specification and drawings as set forth below.

DESCRIPTION OF THE PREFERRED EMBODIMENTS

Figure 1:
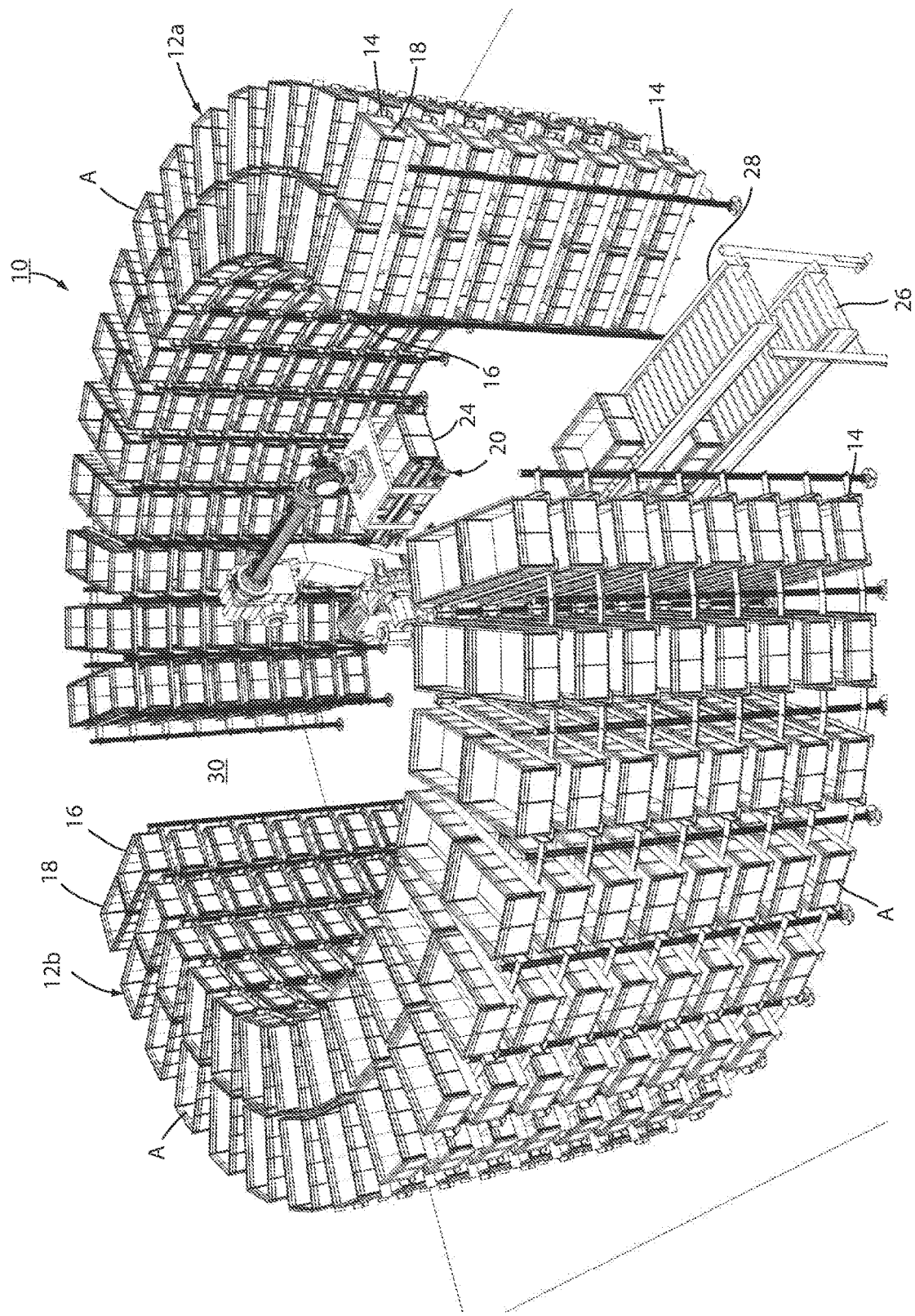
FIG. 1 is a perspective view of an automated storage and retrieval system according to an embodiment of the invention.

Referring now to the drawings and illustrative embodiments depicted therein, a robotic automated storage and retrieval system 10 includes at least one stacked storage rack 12a, 12b that is configured to store articles A double deep rows in each storage location, with one article at a front position or row 16 and another article at a back position or row 18 behind the one article. While articles are illustrated as totes, they could be other receptacles such as cartons or trays or could be individual articles. Although the articles are shown being consistent width, the principles of the invention may be used with receptacles or articles of various widths.

Figure 3:
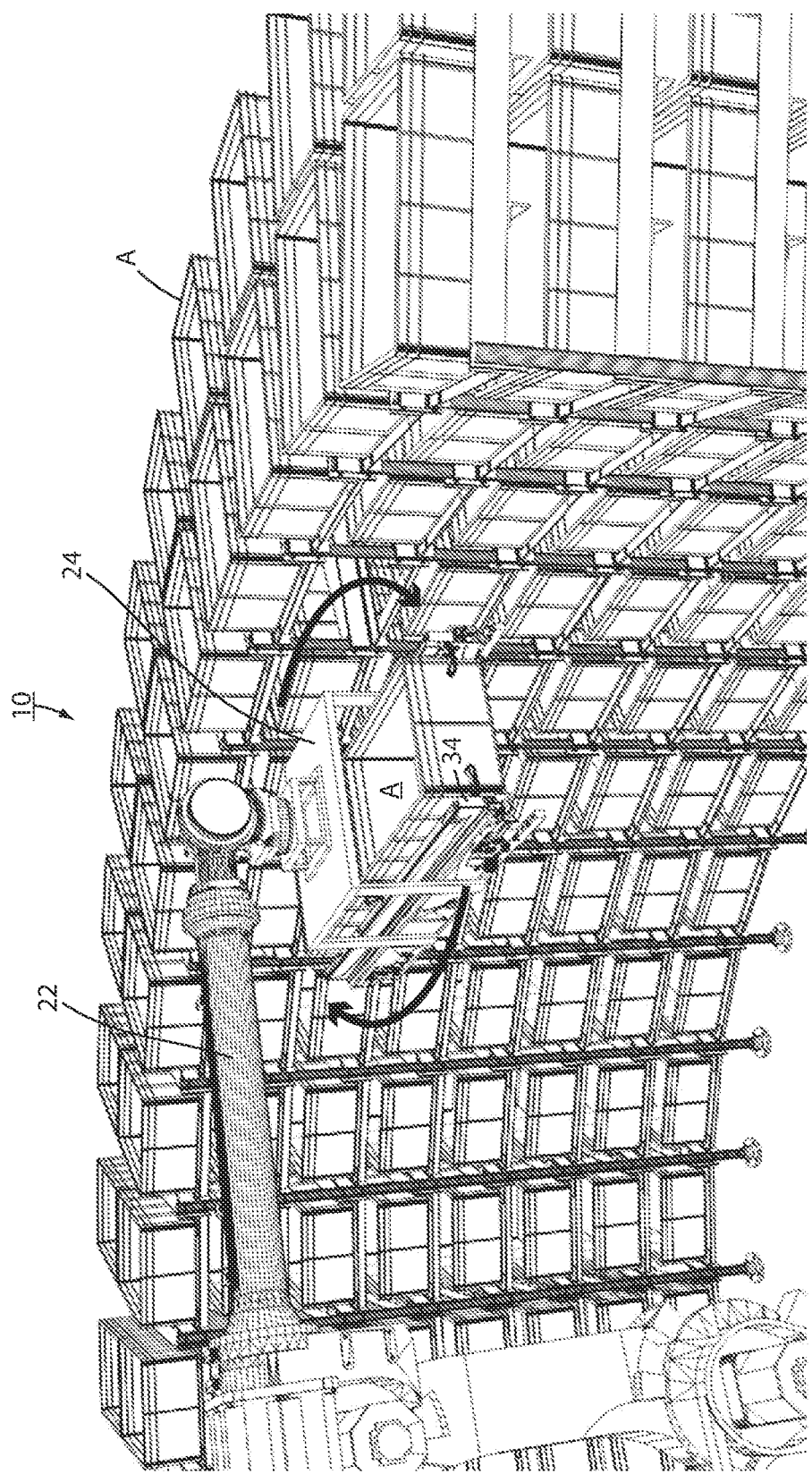
FIG. 3 is the same view as FIG. 2 showing the robot rotating the EOAT 180° about a generally vertical axis.

System 10 includes a stationary robot 20 having a robotic arm 22 in the illustrated embodiment and an end of arm tool (EOAT) 24 positioned at a distal end of arm 22. Alternatively, robot 20 may be a gantry-type robot which would have an end of art tool 24. EOAT 24 has a platform 32 and an extendable article manipulator, such as a pair of extendable guides 34, each having actuatable fingers to pull and push on the articles. Platform 32 is sized to support at least two tandem articles. Manipulator 34 is controllable to extend and retract from opposite ends of platform 32 in order to retrieve at least one article from a rack 12a, 12b to platform 32 or to remove at least one article from platform 32 to a rack 12a, 12b. Robot 20 is adapted to rotate end of arm tool 24 about a generally vertical axis as best illustrated in FIG. 3. A programmable control system (not shown) maintains tract of all articles in storage racks 12a, 12b and controls overall operation of robot 20 and end of arm tool 24.

Figure 8:
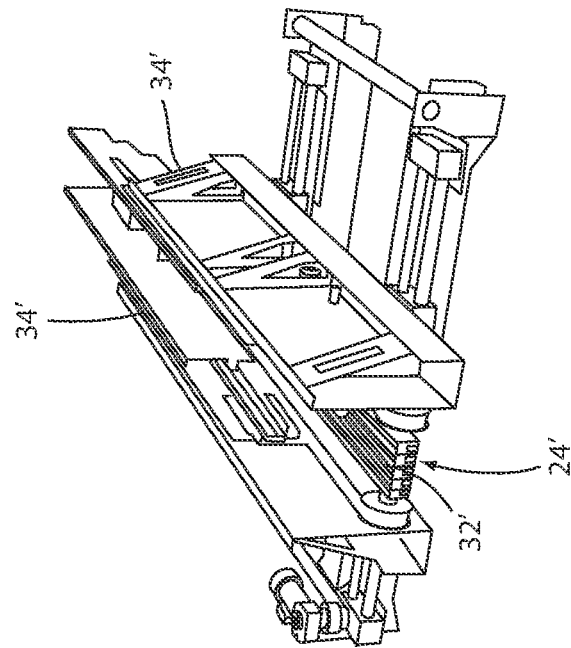
FIG. 8 is the same view as FIG. 7 of an alternative end of arm tool.

Manipulator 34 is adapted to concurrently position at least two articles to platform 32 or to remove at least one article from the platform, although two or more articles are possible. Manipulator 34 is extendable in opposite directions from open ends of platform 32 in order to concurrently remove up to two articles from front and back storage locations of the rack and to position the articles to the platform; or to remove up to two articles from the platform and store the article to front or back location of the rack. Detailed structure and operation of manipulator 34 is set forth in commonly assigned U.S. Pat. No. 8,790,061, the disclosure of which is hereby incorporated herein by reference in its entirety, and will not be repeated herein. While in the illustrated embodiment, manipulator 34 is extendable guides that are adapted to grasp articles from their sides, the manipulator may alternatively be a platen that is adapted to support at least one article from below or other form of known extendable article manipulator. While manipulator 34 may be of fixed spacing in order to handle articles of consistent width such as totes or trays, they may have variable spacing as shown in FIG. 8 in order to support variable width articles. Platform 32 may be a stationary plate with articles moved to opposite ends of the plate by manipulator 34. Alternatively, platform 32 may be made up of a conveying surface defined by a powered belt or powered belt strips as shown in FIG. 7 and as commercially available by Dematic Corp under the Typhoon brand.

Each stacked storage rack 12a, 12b has an arcuate front although other shapes are possible including parallel flat fronts and the like. Racks 12a, 12b form a pair of stacked storage racks that are facing each other on opposite sides of robot 20 in a generally circular cylindrical configuration.

Figure 2:
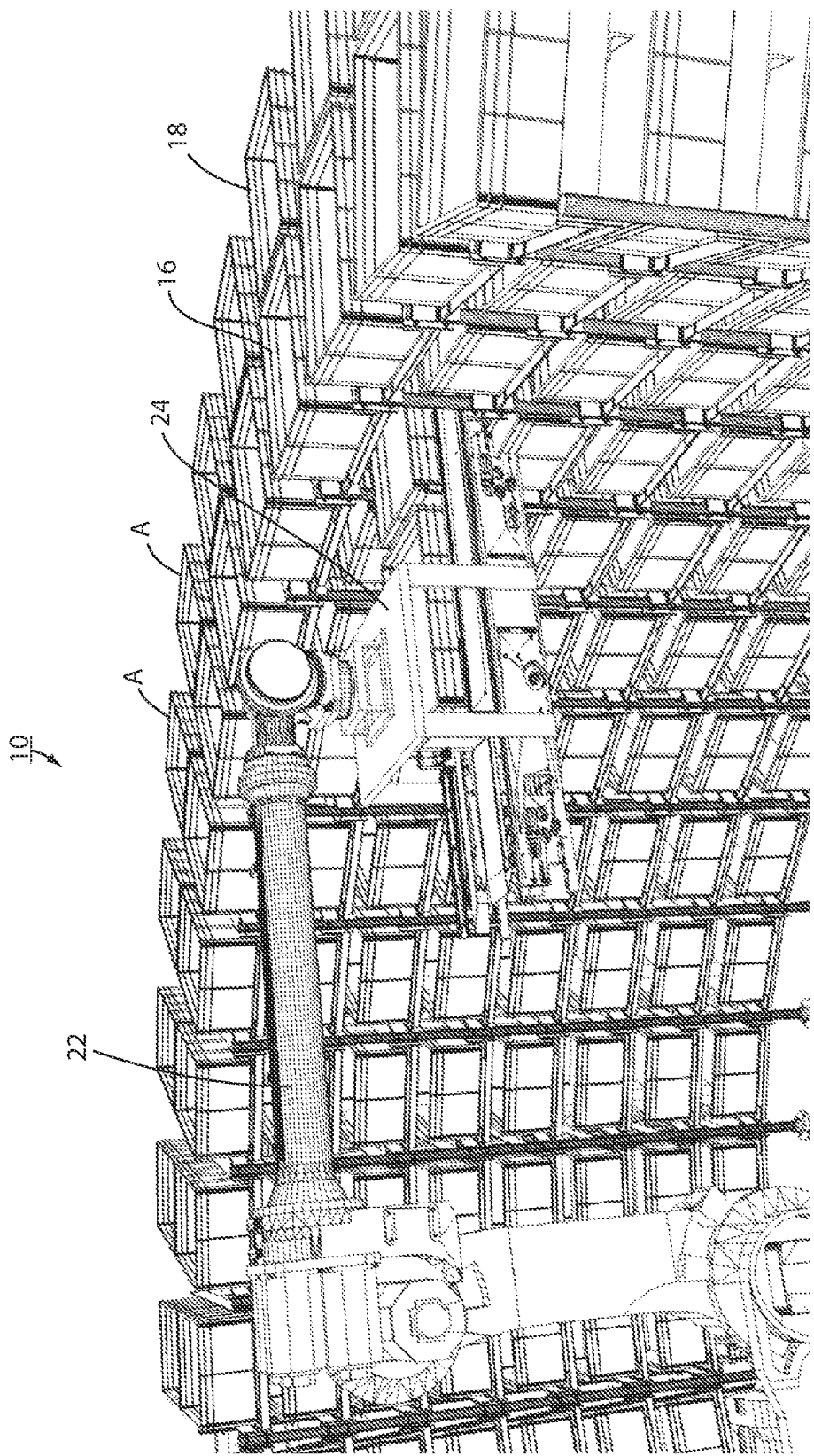
FIG. 2 is the same view as FIG. 1 showing the robotic arm selectively positioning the end of arm tool which is retrieving articles from front and back storage locations of a stacked storage rack.
Figure 4:
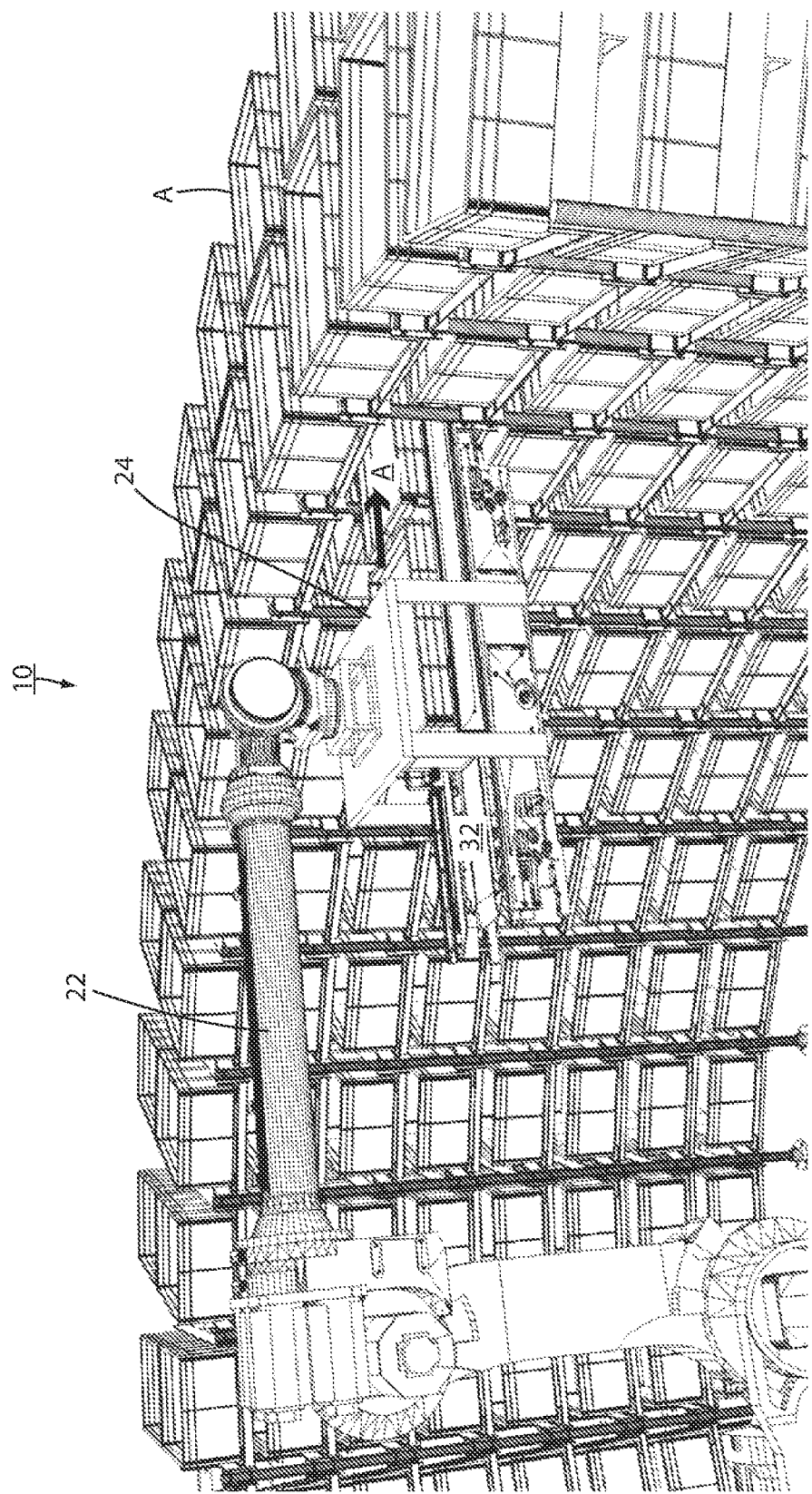
FIG. 4 is the same view as FIG. 3 showing the robot selectively positioning the end of arm tool and storing the excess article from the platform to a front or back storage location after the robot rotating EOAT 180° about the generally vertical axis.
Figure 5:
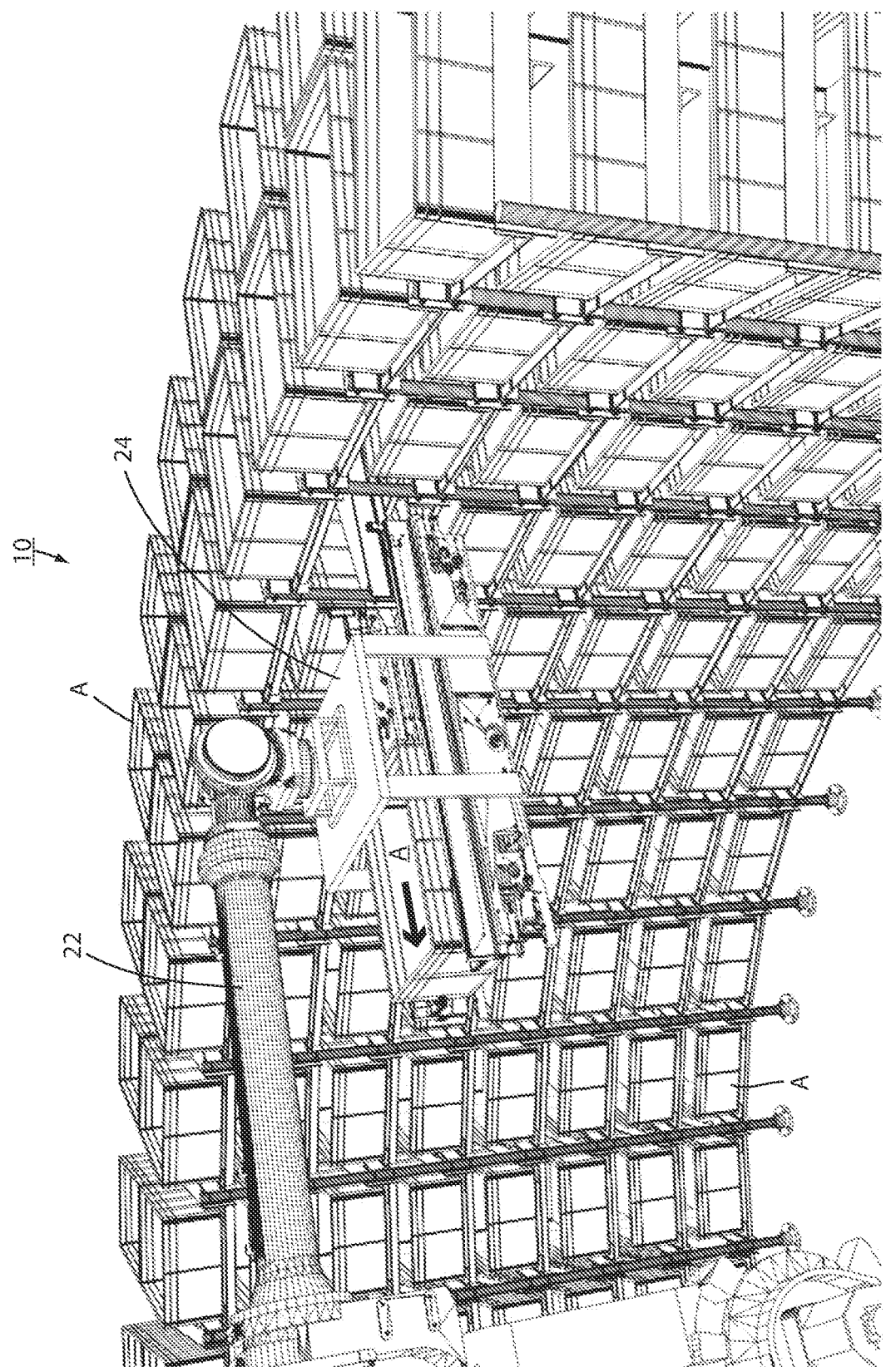
FIG. 5 is the same view as FIG. 4 showing the arms retracting from the storage rack after storing the excess article and concurrently repositioning the article remaining on the platform.
Figure 6:
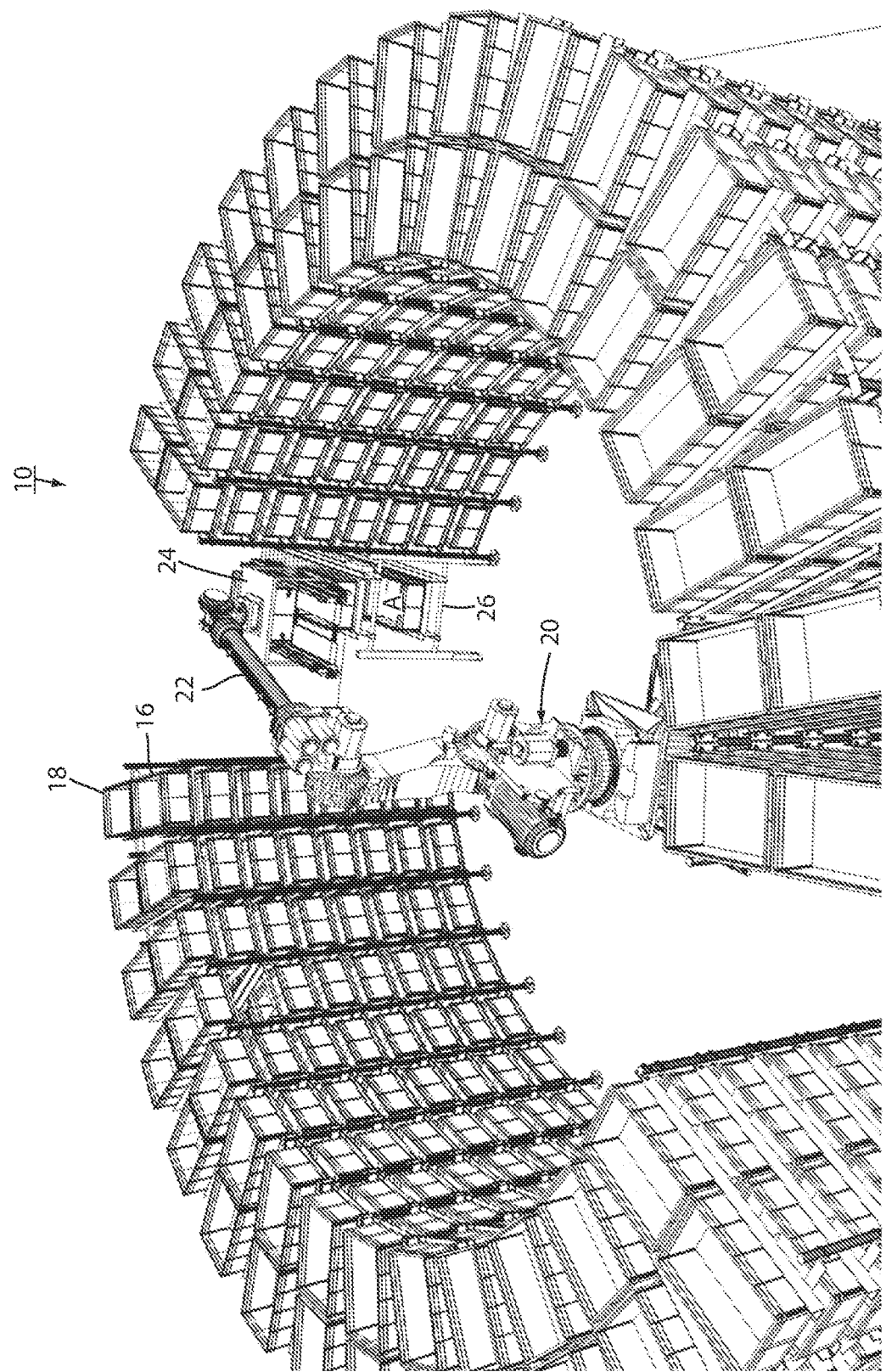
FIG. 6 shows the robot positioning the EOAT to the outbound conveyor to discharge the article remaining on the platform and picking up an inbound article from the inbound conveyor.

When an article A is desired to be retrieved from back storage position 18 notwithstanding another article A in front storage position 16 in front and blocking the desired article, robot 20 positions end of arm tool 24 at the desired location in storage rack 12 as shown in FIG. 2. Manipulator 34 extends outwardly to double-deep length and pairs of pivoting fingers are actuated in order to engage the front and back articles. The manipulator is then retracted, along with any conveyor of platform 32 being operated, in order to retrieve articles from the front and back storage positions to support the retrieved articles to the platform. EOAT 24 is then rotated 180 degrees about a generally vertical axis at the end of robotic arm 22 as shown in FIG. 3. This positions the blocking article that was removed from the front storage position to be closest to the rack as shown in FIG. 4. The blocking article from the front storage position can be re-stored to either the front or rear storage location by extending manipulator 34 an appropriate length. The desired article to be retrieved from the rear storage position is retained on the platform 32 as shown in FIG. 5 while retracting the manipulator to remove them from the stacked storage rack. Robot 20 then positions EOAT 24 at outbound conveyor 28 and manipulator 34 position the desired article to the outbound conveyor. EOAT 24 may then pick up any in-bound article intended to be put into storage from in-bound conveyor 26 and the process described above is reversed if it is desired to place the in-bound article in a vacant back storage location 18 behind another article already in the front storage location. Alternatively the existing front article could be pushed to the back storage location from the front storage location using manipulator 34 and the incoming article positioned in the open front storage location.

Figure 7:
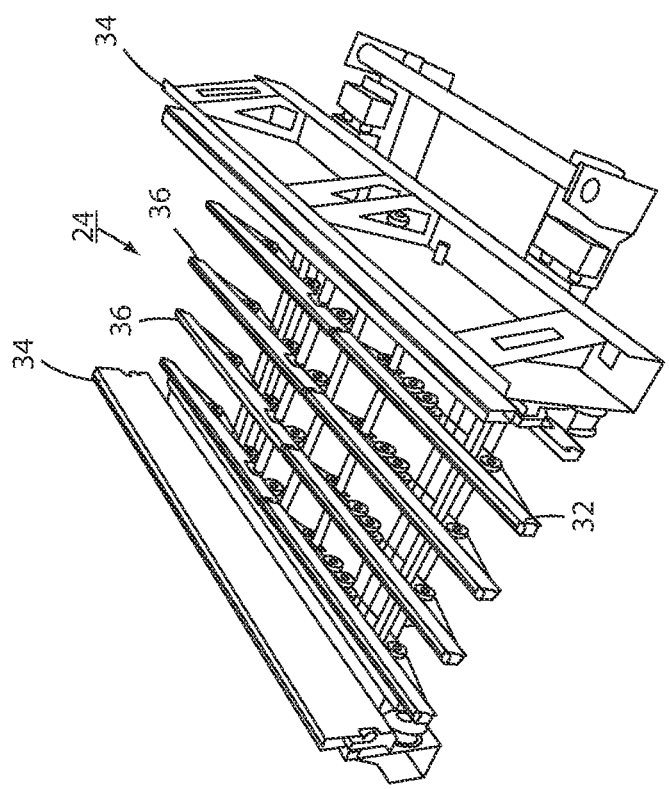
FIG. 7 is a perspective view of the end of arm tool.

FIG. 7 illustrates details of EOAT 24. FIG. 8 illustrates an alternative EOAT 24' having manipulator 34' that are adjustable to variable spacing in order to match the width of variable width articles. This allows articles of variable width, such as individual articles to be handled.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. An automated storage and retrieval system, comprising:
   at least one stacked storage rack that is configured to store articles double deep in each of a plurality of storage locations with one article at a front position and another article at a back position behind the one article;
   a robot having an arm and an end of arm tool (EOAT), wherein the EOAT is arranged at a distal end of the arm;
   said EOAT having a platform with opposite ends and an extendable article manipulator, said platform sized to support at least two articles, said article manipulator adapted to extend and retract double deep in opposite directions from the opposite ends of said platform, in order to retrieve at least one article to said platform from a storage location of said at least one stacked storage rack or to place at least one article from said platform to a storage location of said at least one stacked storage rack; and said EOAT being arranged on said distal end of said arm to be rotatable 180 degrees by said robot about a generally vertical axis while maintaining said EOAT in a horizontal orientation to selectively position either of the opposite ends of said platform at one of said storage locations of said at least one stacked storage rack.

2. The system as claimed in claim 1 wherein said extendable article manipulator is adapted to concurrently position at least two articles to said platform or to remove at least one article from said platform.

3. The system as claimed in claim 2 wherein said extendable article manipulator is adapted to concurrently retrieve at least two articles from front and back positions of said rack and to position the articles to the platform or to remove at least one article from said platform and to store the at least one article to front or back location of said rack.

4. The system as claimed in claim 1 wherein said extendable article manipulator comprises at least one platen adapted to support at least one article from below or a pair of guides adapted to support at least one article from its sides.

5. The system as claimed in claim 1 wherein said extendable article support manipulator is adapted to support variable width articles.

6. The system as claimed in claim 1 wherein said platform comprises a conveying surface.

7. The system as claimed in claim 1 wherein said at least one stacked storage rack has an arcuate front.

8. The system as claimed in claim 7 wherein said at least one stacked storage rack comprises a pair of stacked storage racks that are facing each other on opposite sides of said robot.

9. The system as claimed in claim 1, wherein said EOAT is disposed vertically downwardly from said distal end of said arm and is rotatable beneath said distal end of said arm.

10. An automated storage and retrieval system, comprising:
at least one stacked storage rack that is configured to store articles double deep in each of a plurality of storage locations with one article at a front location and another article at a back location behind the one article;
a robot having an arm and an end of arm tool (EOAT), wherein the EOAT is arranged at a distal end of the arm;
said EOAT having a platform with opposite ends and an extendable article manipulator, said platform sized to support at least two articles, said article manipulator adapted to extend from the opposite ends of said platform in opposite directions;
said article manipulator adapted to retrieve articles from said front and/or back positions to said platform and to store at least one of the retrieved articles from said platform to said front and/or back positions; and
said EOAT being arranged on said distal end of said arm to be rotatable 180 degrees by said robot about a generally vertical axis while maintaining said EOAT in a horizontal orientation, with said robot adapted to (i) position one said end of said EOAT to one said storage location of said at least one stacked storage rack and retrieve articles from said front and said back storage positions at said one said storage location to said platform, (ii) rotate said EOAT 180 degrees about the generally vertical axis at the distal end of the arm with the retrieved articles on the platform to position the opposite said end of said EOAT to said one said storage location, and (iii) store at least one of the retrieved articles from said platform to said front or said back storage position at said one said storage location.

11. The system as claimed in claim 10 wherein said EOAT is adapted to store one of said articles to a front or back storage position after said robotic arm rotates said EOAT and to discharge the other of said articles to a discharge conveyor after storing the one of said articles.

12. The system as claimed in claim 10 wherein said extendable article manipulator comprises a platen adapted to support at least two articles from below or a pair or arms adapted to support at least two article from its sides.

13. The system as claimed in claim 10 wherein said extendable article manipulator is adapted to support variable width articles.

14. The system as claimed in claim 10 wherein said platform comprises a conveying surface.

15. The system as claimed in claim 10 wherein said at least one stacked storage rack has an arcuate front.

16. The system as claimed in claim 15 wherein said at least one stacked storage rack comprises a pair of stacked storage racks that are facing each other on opposite sides of said robotic positioning device.

17. The system as claimed in claim 10 wherein said robot is adapted to position said end of arm tool to store at least one of the articles from said platform to a front or back storage position after rotating said EOAT 180 degrees about the generally vertical axis at the distal end of the arm.

18. A method of storing articles to and retrieving articles from at least one stacked storage rack that is configured to store articles double deep in each of a plurality of storage locations with one article at a front position and another article at a back position behind the one article; said method comprising:
having a robot with an arm and an end of arm tool (EOAT), wherein said EOAT is arranged at a distal end of said arm, said EOAT having a platform with opposite ends and an extendable article manipulator, said platform sized to support at least two articles;
extending and retracting said article manipulator from one of said ends of said platform for retrieving at least one article from said at least one stacked storage rack to said platform and from an opposite said end of said platform for storing at least one article from said platform to said at least one stacked storage rack; and
rotating said end of arm tool 180 degrees about a generally vertical axis at the distal end of the arm while maintaining said EOAT in a horizontal orientation between said retrieving and said storing.

19. The method as claimed in claim 18 wherein said extendable article manipulator concurrently positions at least two articles from said at least one stacked storage rack to said platform to retrieve at least one of the at least two articles and removes at least one article from said platform to store the at least one article.

20. The method as claimed in claim 19 wherein said extendable article manipulator supports concurrently removing at least two articles from front and back positions of said rack and positioning the articles to the platform or concurrently removing at least one article from said platform and storing the article to the front or back position of said rack.

21. The method as claimed in claim 18 wherein said extendable article manipulator comprises a platen adapted to support at least one article from below or a pair or arms adapted to support at least one article from its sides.

22. The method as claimed in claim 18 wherein said extendable article manipulator is adapted to support variable width articles.

23. The method as claimed in claim 18 wherein said platform comprises a conveying surface.

24. The method as claimed in claim 18 wherein said at least one stacked storage rack has an arcuate front.

25. The method as claimed in claim 24 wherein said at least one stacked storage rack comprises a pair of stacked storage racks that are facing each other on opposite sides of said robotic positioning device.

* * * * *

UNITED STATES PATENT AND TRADEMARK OFFICE
CERTIFICATE OF CORRECTION

PATENT NO. : 12,172,837 B2
APPLICATION NO. : 17/323471
DATED : December 24, 2024
INVENTOR(S) : Mark D. O'Brien and Kevin M. Heath Page 1 of 1

It is certified that error appears in the above-identified patent and that said Letters Patent is hereby corrected as shown below:

In the Claims

Column 4
Line 66, Claim 1, "said platform, in" should be --said platform in--

Signed and Sealed this
Fifteenth Day of April, 2025

Coke Morgan Stewart
*Acting Director of the United States Patent and Trademark Office*